United States Patent
Arnold et al.

(10) Patent No.: US 8,317,006 B2
(45) Date of Patent: Nov. 27, 2012

(54) DOUBLE CLUTCH COMPRISING A TORSIONAL VIBRATION DAMPER

(75) Inventors: Johannes Arnold, Achern (DE); Dirk Hofstetter, Durmersheim (DE); Ivo Agner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/289,749

(22) Filed: Nov. 4, 2011

(65) Prior Publication Data

US 2012/0043176 A1    Feb. 23, 2012

Related U.S. Application Data

(63) Continuation of application No. PCT/DE2010/000486, filed on Apr. 29, 2010.

(30) Foreign Application Priority Data

May 6, 2009    (DE) .................... 10 2009 019 873

(51) Int. Cl.
*B60K 6/485*  (2007.10)
*B60K 6/40*   (2007.10)
(52) U.S. Cl. ................. 192/48.611; 74/574.2
(58) Field of Classification Search ............ 192/48.609; 74/574.2
See application file for complete search history.

(56) References Cited

U.S. PATENT DOCUMENTS

| | | | | |
|---|---|---|---|---|
| 2,104,259 | A  * | 1/1938 | Kales ............................ | 290/1 R |
| 2,635,470 | A  * | 4/1953 | Lewis ............................. | 74/7 R |
| 2,770,971 | A  * | 11/1956 | Doane ............................... | 74/6 |
| 6,089,121 | A  * | 7/2000 | Lohaus ......................... | 464/68.4 |
| 6,302,253 | B1 * | 10/2001 | Link et al. ................... | 192/55.61 |
| 6,437,467 | B1 * | 8/2002 | Schierling et al. ............. | 310/51 |
| 6,586,852 | B2 * | 7/2003 | Geiger et al. .................. | 310/51 |
| 7,510,065 | B2 * | 3/2009 | Taylor et al. .................. | 192/115 |
| 2005/0279603 | A1 * | 12/2005 | Agner ........................ | 192/48.8 |
| 2005/0279604 | A1 * | 12/2005 | Vetter et al. ................. | 192/48.8 |
| 2006/0225984 | A1 * | 10/2006 | Tanishima et al. ........... | 192/48.8 |
| 2007/0277644 | A1 * | 12/2007 | King et al. ................... | 74/572.2 |
| 2009/0000896 | A1 * | 1/2009 | Knowles ...................... | 192/48.1 |
| 2010/0282560 | A1 * | 11/2010 | Voegtle et al. ............... | 192/48.1 |
| 2011/0259698 | A1 * | 10/2011 | Arnold et al. ................ | 192/48.1 |

FOREIGN PATENT DOCUMENTS

| | | |
|---|---|---|
| DE | 10034730 | 8/2001 |
| DE | 102008005138 | 8/2008 |
| EP | 1744074 | 1/2007 |
| FR | 2 792 981 A1 * | 11/2000 |
| JP | 2003-63261 A * | 3/2003 |
| WO | WO 2008/092426 A2 * | 8/2008 |

* cited by examiner

*Primary Examiner* — Rodney Bonck
(74) *Attorney, Agent, or Firm* — Simpson & Simpson, PLLC

(57) ABSTRACT

A double clutch transmission comprising a wet dual clutch, a dual mass flywheel and a centrifugal force pendulum and an electric motor which is connected to the primary side of the dual mass flywheel.

2 Claims, 3 Drawing Sheets

DOUBLE CLUTCH COMPRISING A TORSIONAL VIBRATION DAMPER

CROSS-REFERENCE TO RELATED APPLICATIONS

This application is filed under 35 U.S.C. §120 and §365(c) as a continuation of International Patent Application No. PCT/DE2010/000486 filed Apr. 29, 2010, which application claims priority from German Patent Application No. DE 10 2009 019 873.3 filed May 6, 2009, which applications are incorporated herein by reference in their entireties.

FIELD OF THE INVENTION

The invention relates to a double clutch having two wet clutches situated in a wet chamber and a torsional vibration damper.

BACKGROUND OF THE INVENTION

Double clutches for motor vehicles are known.

These may be designed as double clutches having two wet clutches nested radially one on top of the other or situated axially in series, which are operated in a closed wet chamber that is filled with a fluid such as hydraulic fluid or the like.

In addition, torsional vibration dampers may be provided in the wet chamber to damp torsional vibrations, which are introduced into the power train in particular by internal combustion engines such as high-torque diesel engines. At the same time, as the internal combustion engine runs increasingly roughly, the torsional vibration dampers, for example dual mass flywheels, must be of more robust design, which causes the axial construction space of the double clutch to increase due to the torsional vibration damper situated axially adjacent to the wet clutches.

BRIEF SUMMARY OF THE INVENTION

It is an object of the present invention to specify such a double clutch transmission having an integrated electric machine.

This object is fulfilled according to the invention by a double clutch transmission having a wet double clutch, a dual mass flywheel (DMF) and a centrifugal force pendulum (CFP), and having an electric machine that is connected to the primary side of the dual mass flywheel.

Hence an electric motor is connected between the double wet clutch and the internal combustion engine. That results in the possibility of realizing start-stop functionalities using the electric motor, for boosting and recovery. The electric machine is located, together with a dual mass flywheel needed for vibration isolation, in a dry chamber, and is separated from the clutch chamber by a cover. The clutch chamber is then designated as the wet chamber.

In particular, the stator of the electric machine is connected to the transmission housing.

Furthermore, it is preferred that the rotor of the electric machine be tied to the primary side of the DMF, for example through a direct connection such as welding or riveting, or through an indirect connection such as introduction of force into the primary side of the springs of the DMF.

In addition, the centrifugal force pendulum may be situated in the dry chamber. In particular, the CFP may be integrated into the DMF.

Alternatively to this, the CFP may be integrated into the wet chamber. In particular, the CFP may be tied in this case to the primary mass of the clutch.

BRIEF DESCRIPTION OF THE DRAWINGS

The present invention will be explained in greater detail below on the basis of preferred exemplary embodiments, in combination with the pertinent figures. These show the following.

DETAILED DESCRIPTION OF THE INVENTION

Figure 1:
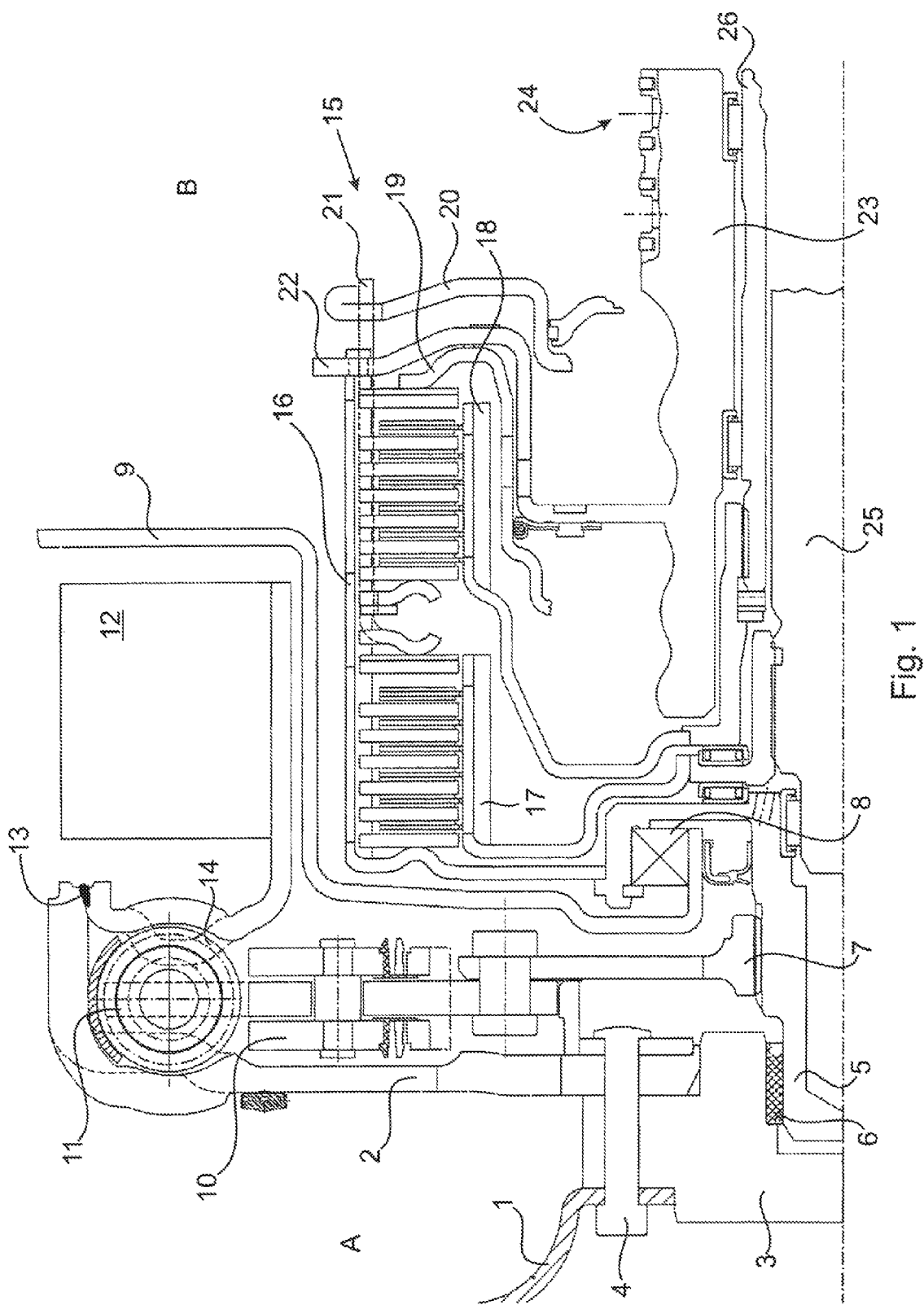
FIG. 1 illustrates an exemplary embodiment of the present double clutch transmission, wherein the electric machine, DMF and CFP are situated in the dry chamber.

FIG. 1 shows part of a power train of a motor vehicle, wherein the drive torque in particular of an internal combustion engine or of some other drive is transmitted through a flange 1 to a primary side 2 of a dual mass flywheel. A cross shaft coming from a differential may be situated in the free construction space remaining between flange 1 and primary side 2.

In the present case a connecting piece 3 is situated between flange 1 and primary side 2, both flange 1 and primary side 2 being connected according to the illustrated exemplary embodiment by means of common riveted connections 4 and/or threaded connections. Connecting piece 3 serves in addition to support the DMF on the drive side via sleeve 5, there being a friction bearing 6 situated between sleeve 5 and connecting piece 3. Formed in addition on sleeve 5 is toothing or some other type of connection, such as a feather key, whereby sleeve 5 and a secondary-side flange 7 of the DMF are connected to each other. In addition, sleeve 5 is supported on the transmission side on a cover 9 by means of fixed bearing 8. Cover 9 is attached indirectly or directly to the transmission housing, and separates dry chamber A from wet chamber B. Integrated into flange 7 of the DMF is a centrifugal force pendulum 10. Spring assemblies are situated as dampers between primary side 2 of the DMF and secondary side 7 of the DMF. A rotor of an electric motor 12 is tied to the primary side of the DMF, in the present case by means of a weld 13 (all other types of connection other than welding also being possible). At the same time, or as an alternative to this type of connection, the link on the primary side may also be realized by engagement of the rotor on the primary side of the spring assemblies via the shape 14. The stator of electric machine 12 is connected to the transmission housing.

Double clutch 15 has two wet clutches situated axially in series, having a pot-like formed plate carrier 16 as the input side and two pot-like formed plate carriers 17 and 18 as the output side of double clutch 15. It is operated via pistons 19 and 20, where piston 19 operates the clutch situated on the transmission side and piston 20 operates the clutch situated on the motor side. To this end, piston 20 is connected to another pot-like component 21 which reaches through a carrier component 22, carrier component 22 connecting the pot-like shaped plate carrier 16 with the primary mass 23 of the clutch. The primary mass 23 of the clutch also includes the hydraulic fluid supply 24, which is not depicted in detail in FIG. 1.

The two pot-like formed plate carriers 17 and 18, as the output side of double clutch 15, are each connected to one of the output shafts 25 and 26 of the double clutch transmission.

Figure 3:
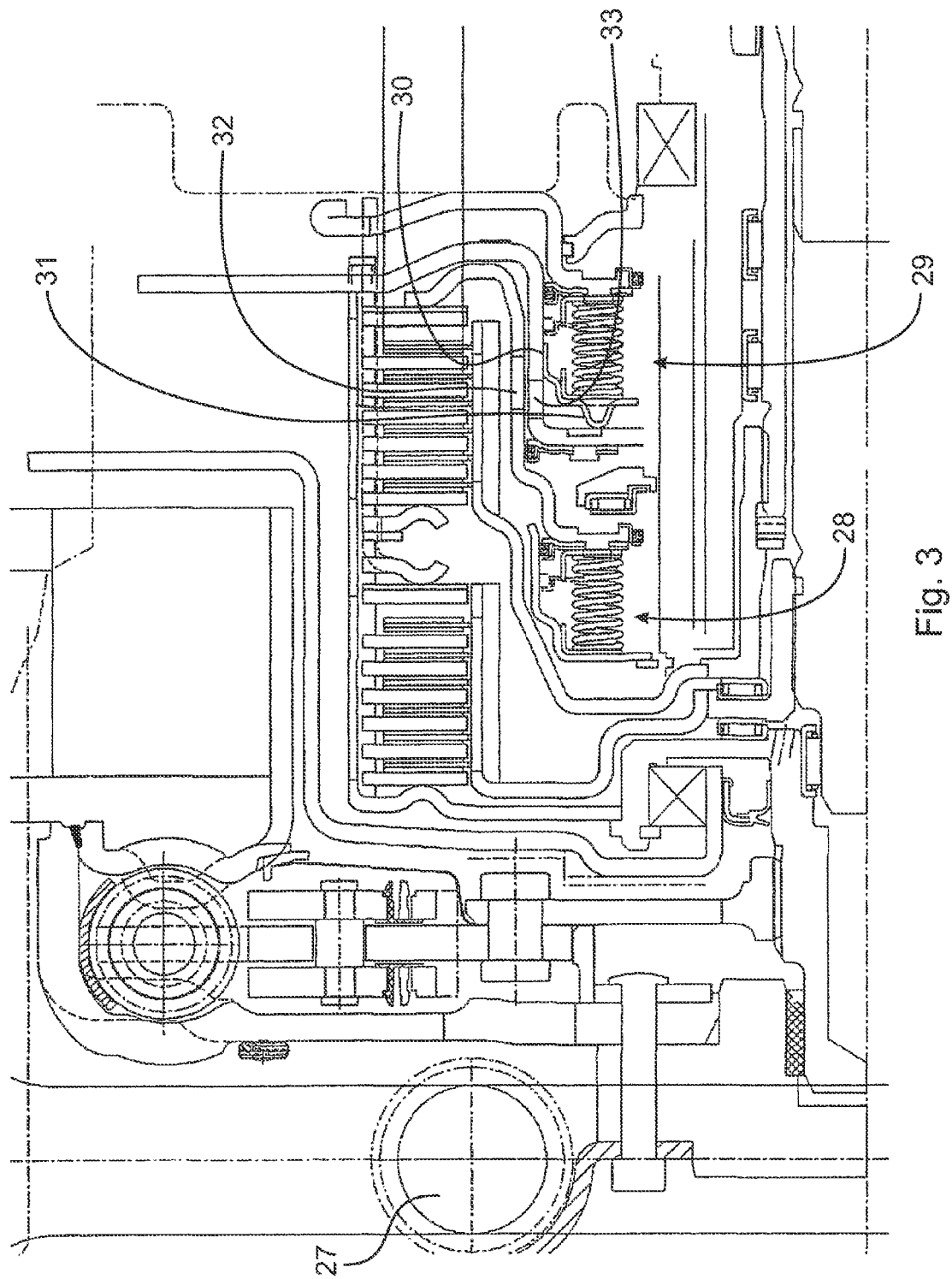

The depiction according to FIG. 3 shows cross shaft 27, which is situated in the free construction space between flange 1 and primary side 2.

In addition, FIG. 3 also shows a possible design of the actuating elements 28, 29 of pistons 19 and 20. As may be seen from FIG. 3, at least the actuating space of actuating element 29 is designed in two parts, due to the design of plate 30, which has lug-like protrusions 31 (so that sufficient construction space remains for the stream of hydraulic fluid). Correspondingly, both carrier component 22 and piston 20 have correspondingly sufficiently overlapping openings 32 and 33 to enable a flow of hydraulic fluid in both the actuated and the non-actuated state.

Figure 2:
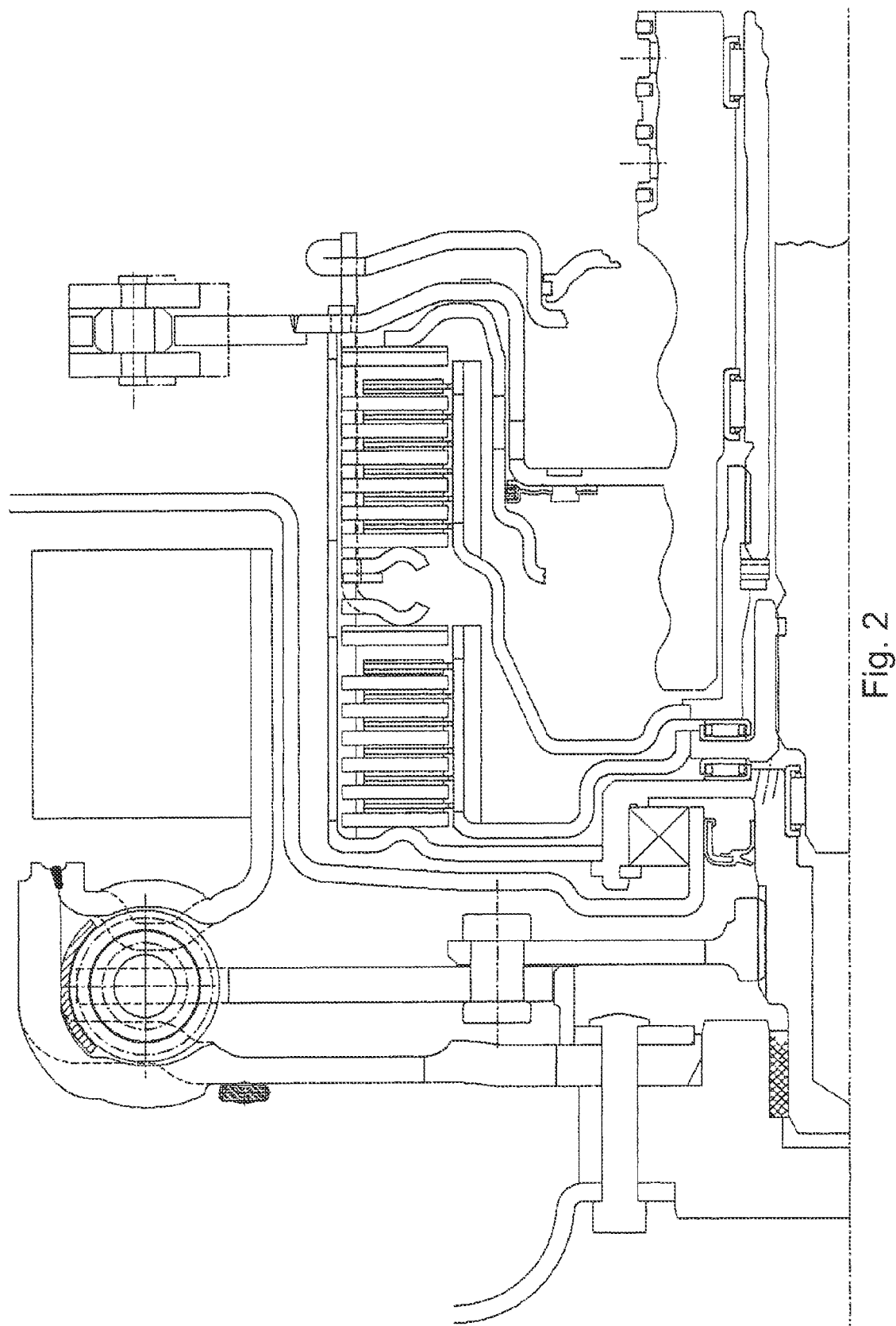
FIG. 2 illustrates an exemplary embodiment of the present double clutch transmission, wherein the electric machine and the DMF are situated in the dry chamber and the CFP is in the wet chamber; and, FIG. 3 illustrates another depiction of the exemplary embodiment according to FIG. 1, wherein one possible design of the pistons of the wet clutch is indicated.

The exemplary embodiment according to FIG. 2 corresponds to the greatest extent possible to the exemplary embodiment according to FIG. 1 and FIG. 3, with the CFP being integrated however into the wet chamber and tied to the primary mass of the clutch.

The present invention integrates an electric machine and an axially nested double wet clutch into a predefined clutch construction space (in particular radially small and axially further-extended construction spaces).

The components are arranged so that the electric machine, including the components needed for vibration isolation such as bow spring damper and centrifugal force pendulum, may be located in the dry chamber, while the clutch is situated in the wet chamber (as shown in the exemplary embodiment according to FIG. 1).

The present double clutch is designed in particular for double clutch transmission having wet clutches which are arranged axially in series.

A conventional DMF may be inserted ahead of the clutch, if the CFP is integrated into the wet chamber of the clutch.

The present double clutch may be utilized in particular in the torque class <400 Nm.

The present double clutch may also be utilized in hybrid vehicles, among other uses.

What is claimed is:

1. A double clutch transmission, comprising:
a drive sleeve;
a carrier connected with the drive sleeve so that rotation of the carrier is locked to rotation of the drive sleeve; and,
a plurality of clutch plates with respective radially outer portions engaged with the carrier;
a dual mass flywheel (DMF) including:
a primary side arranged to receive drive torque from an engine;
at least one spring in contact with the primary side;
a secondary-side flange engaged with the at least one spring and connected with the drive sleeve so that rotation of the secondary-side flange is locked to rotation of the drive sleeve; and,
a centrifugal force pendulum (CFP) directly connected to the secondary-side flange and located between the at least one spring and the drive sleeve; and,
an electric machine including a rotor:
directly connected to the primary side such that respective rotations of the rotor and the primary side are locked and such that the rotor and the primary side rotate at a same speed about an axis of rotation for the double clutch; or,
with a portion circumferentially aligned with and engaged with the at least one spring.

2. A double clutch transmission, comprising:
a drive sleeve;
a carrier connected with the drive sleeve so that rotation of the carrier is locked to rotation of the drive sleeve;
a plurality of clutch plates with respective radially outer portions engaged with the carrier;
a dual mass flywheel (DMF) including:
a primary side arranged to receive drive torque from an engine;
at least one spring in contact with the primary side;
a secondary-side flange engaged with the at least one spring and connected with the drive sleeve so that rotation of the secondary-side flange is locked to rotation of the drive sleeve; and,
a centrifugal force pendulum (CFP) located between the at least one spring and the drive sleeve and including:
first and second portions connected to the secondary-side flange and located on oppositely facing sides of the secondary-side flange; and,
an axis passing through the first and second portions and the secondary-side flange; and,
an electric machine including a rotor:
directly connected to the primary side such that respective rotations of the rotor and the primary side are locked and such that the rotor and the primary side rotate at a same speed about an axis of rotation for the double clutch; or,
with a portion circumferentially aligned with and engaged with the at least one spring, wherein the first and second portions of the CFP are at least partially rotatable about the axis passing through the secondary-side flange.

* * * * *